United States Patent [19]

Itoh et al.

[11] 4,150,010

[45] Apr. 17, 1979

[54] ELASTOMER COMPOSITIONS

[75] Inventors: Kunio Itoh; Takeshi Fukuda, both of Annaka; Toshimichi Oshima, Takasaki, all of Japan

[73] Assignee: Shin-Etsu Chemical Co., Ltd., Tokyo, Japan

[21] Appl. No.: 877,822

[22] Filed: Feb. 15, 1978

[30] Foreign Application Priority Data

Feb. 21, 1977 [JP] Japan .................................. 52/17865

[51] Int. Cl.$^2$ ............................................. C08G 77/04
[52] U.S. Cl. ................................ 260/37 SB; 260/827; 528/30; 528/24
[58] Field of Search .............. 260/827, 37 SB, 46.5 G; 528/30, 24

[56] References Cited

U.S. PATENT DOCUMENTS

| 3,227,777 | 1/1966 | Safford | 260/827 |
| 4,070,414 | 1/1978 | Falender et al. | 260/827 |
| 4,070,526 | 1/1978 | Colquhoun et al. | 260/827 |

Primary Examiner—Melvyn I. Marquis
Attorney, Agent, or Firm—Toren, McGeady and Stanger

[57] ABSTRACT

The invention provides a novel elastomer composition capable of giving vulcanized rubber products with superior solvent resistance, oil resistance, heat resistance and other properties. The composition is formulated with a polymer blend of an ethylene-propylene copolymeric elastomer and a specific organopolysiloxane having certain amount of mercapto-substituted organic groups bonded to the silicon atoms as the base component admixed with a filler and a crosslinking agent or a vulcanizing agent.

8 Claims, No Drawings

ELASTOMER COMPOSITIONS

BACKGROUND OF THE INVENTION

The present invention relates to a novel and improved elastomer composition having excellent mold releasability, resistance to heat, solvents and oils, and mechanical, electric and other properties or, in particular, to an elastomer composition formulated on the base of an ethylene-propylene copolymeric elastomer having similar, excellent physical properties.

Ethylene-propylene copolymeric elastomers, such as the so-called EPR, i.e. ethylene-propylene rubbers, EPT, i.e. ethylene-propylene terpolymers, and EPDM, i.e. ethylene-propylene-diene terpolymers, have a considerably good weathering resistance and heat resistance resulting from the very low content of, or even absence of, unsaturated linkages in their molecular structure as well as excellent electric properties as a synthetic rubber. Demands and uses of these elastomers have rapidly grown in recent years owing to the advantages of the above-mentioned properties coupled with economical advantages in costs, compared to other synthetic rubbers.

However, the ethylene-propylene copolymeric rubbers are no better than nitrile rubbers and styrene-butadiene copolymeric rubbers in regard to resistance to oils and solvents, and definitely inferior when compared with silicone rubbers and fluorocarbon rubbers not only in oil and solvent resistance but also in mold releasability and heat resistance.

In order to compensate the above described defective properties of ethylene-propylene copolymeric elastomers, a method of polymer blend has been proposed in which those elastomers are blended with a silicone rubber having excellent resistance to oils, solvents, and heat as well as excellent mold releasability, despite some problems as described in the following.

Commercially available silicone rubbers are classified, in general, into three classes according to the mechanisms of crosslink formation. They are (1) those crosslinked with an organic peroxide, (2) those crosslinked by addition reaction between silicon-bonded vinyl groups and silicon-bonded hydrogen atoms with the catalytic action of a platinum catalyst, and (3) those crosslinked by the condensation reaction in the presence of a condensation catalyst such as metal salts of organic acids.

It is evident that the third type of silicone rubbers cannot be co-vulcanized with ethylene-propylene copolymeric elastomers in a polymer blend due to remoteness in the mechanisms of their crosslink forming reactions, since the latter elastomers are usually vulcanized with sulfur, a sulfur-containing vulcanizing agent or an organic peroxide.

The first and the second types of silicone rubbers are, on the other side, co-vulcanizable with ethylene-propylene copolymeric elastomers, if the matter is solely on the possibility of crosslink formation, since at least a small amount of double bonds are almost always introduced into the molecular structure of ethylene-propylene copolymeric elastomers by the copolymerization with a dienic comonomer, such as ethylidenenorbornene, dicyclopentadiene and 1,4-hexadiene, with the purpose of increasing the crosslinkability of the resultant elastomers.

Unfortunately, a polymer blend of a silicone rubber of the second type and an ethylene-propylene copolymeric elastomer has a very short pot life due to the addition reaction taking place even at room temperature in the presence of a platinum catalyst. In addition, the platinum catalyst is very sensitive to deactivation by poisoning with trace amounts of sulfur compounds, amine compounds, phosphorus compounds and certain compounds containing metals, such as lead, tin, zinc, bismuth, cobalt and the like. Thus polymer blends of ethylene-propylene copolymeric elastomers with silicone rubbers of the second type are of less practical importance.

On the other hand, a polymer blend of an ethylene-propylene copolymeric elastomer and a silicone rubber of the first type is also defective due to unbalance between the competitive reactions of the rapid crosslink formation of the silicone rubber with an organic peroxide and the relatively slow crosslink formation of the ethylene-propylene copolymeric elastomer with the same organic peroxide.

Thus the method of the polymer blend of ethylene-propylene copolymeric elastomers with silicone rubbers of any of the three types can not be free from serious disadvantages, not to mention the insufficient improvement of the desired properties.

SUMMARY OF THE INVENTION

The present invention has been completed as a result of the extensive investigations of the inventors to establish a formulation of an elastomer composition based on an ethylene-propylene copolymeric elastomer free from the above described problems in the prior art.

The elastomer composition of the present invention comprises (a) 100 parts by weight of a polymer blend composed of from 50 to 95% by weight of an ethylene-propylene copolymeric elastomer and from 50 to 5% by weight of an organopolysiloxane containing mercapto-substituted organic groups represented by the average unit formula

$$R_a SiO_{\frac{4-a}{2}} \qquad (I)$$

where R is a monovalent organic group and a is a positive number in the range from 1.90 to 2.05 inclusive and at least 0.2 mole % of the groups represented by the symbol R bonded to the silicon atoms are mercaptoalkyl groups, the remainder of the groups R being unsubstituted monovalent hydrocarbon groups, (b) from 10 to 200 parts by weight of a filler, and (c) from 0.1 to 10 parts by weight of a crosslinking agent.

The elastomer composition of the present invention with the formulation defined as above is readily co-vulcanized with sulfur, an organic peroxide or a combination of both and the vulcanizates thus obtained are excellent in the mold releasability, heat resistance, oil resistance, solvent resistance, electric properties, mechanical properties and other properties.

DETAILED DESCRIPTION OF THE PREFERRED EMBODIMENTS

Various kinds of ethylene-propylene copolymeric elastomers known in the art are employed as the base component in the inventive elastomer compositions including elastomeric copolymers of ethylene and propylene (EPR) and copolymers of ethylene and propylene with a third monomer either non-dienic (EPT) or dienic (EPDM). The contents of the propylene monomer units and the ethylene monomer units in these copolymeric elastomers range usually from 10 to 70 mole % or, preferaby, from 15 to 50 mole %, of the former and from 30 to 60 mole % of the latter. When the copolymers are a terpolymer with a dienic third monomer, the iodine values of the copolymers are usually in the range of 5 to 25. Higher contents of the ethylene monomer units in the copolymer result in higher crystallinity of the copolymer giving shaped bodies with higher green strength as well as higher mechanical strengths of the vulcanizates thereof. The average molecular weight of these copolymers is in the range of from about 1 to about $2 \times 10^5$.

On the other side, the organopolysiloxane containing mercapto-substituted organic groups used as combined with the ethylene-propylene copolymeric elastomer is represented by the average unit formula (I) above. The groups represented by the symbol R include substituted or unsubstituted monovalent hydrocarbon groups exemplified by alkyl groups, such as methyl group, ethyl group, propyl group, butyl group and the like; aryl groups, such as phenyl group, tolyl group and the like; alkenyl groups, such as vinyl group, allyl group and the like; those groups with one or more of halogen atoms, cyano groups and the like in place of part or all of the hydrogen atoms in the above-named hydrocarbon groups; and mercapto-substituted organic groups with at least one mercapto group in place of the hydrogen atom in organic groups. The mercapto-substituted organic groups include mercapto-substituted hydrocarbon groups, e.g. mercaptoalkyl groups, such as mercaptomethyl group, 2-mercaptoethyl group, 3-mercaptopropyl group and 3-mercaptocyclopentyl group; and mercapto-substituted aromatic groups, such as 4-mercaptophenyl group and 2-(4-mercaptophenyl)ethyl group, as well as mercapto-substituted, oxygen-containing organic groups, such as those expressed by the formulas $HSCH_2CH_2O-$, $HSCH_2CH_2OCH_2CH_2-$ and $HSCH_2CH_2COOCH_2CH_2CH_2-$. Among these groups, the most preferred are mercaptoalkyl groups or, in particular, 3-mercaptopropyl group. It is essential in the present invention that at least 0.2 mole % of all of the groups represented by the symbol R are mercapto-substituted organic groups. With smaller amounts of the mercapto-substituted organic groups in the organopolysiloxane than 0.2 mole %, the co-vulcanization of the resultant elastomer composition is unsatisfactory. It is, however, not recommendable that more than 50 mole % of the organic groups represented by the symbol R are mercapto-substituted organic groups since excessive amount of mercapto groups results in no additional improvement of the properties of the resultant vulcanizates with only increased production cost. The terminal groups at the chain ends of the organopolysiloxane are not limitative and may be hydroxy groups directly bonded to the silicon atoms or triorganosilyl groups, e.g. trimethylsily, dimethylvinylsilyl and dimethylethoxysilyl groups.

The mercapto-containing organopolysiloxane as defined above can be prepared by co-hydrolysis and co-condensation of a silane mixture composed of a mercapto-containing silane, such as 3-mercaptopropylmethyldichlorosilane, and one or more of other hydrolyzable silanes, such as dimethyldichlorosilane, phenylmethyldichlorosilane, diphenyldichlorosilane and the like, or, alternatively, the co-condensation of two or more kinds of the hydrolyzates obtained by the hydrolysis of the individual ones of the hydrolyzable silanes above-mentioned including the mercapto-containing silanes.

The rheological properties of these organopolysiloxanes differ widely according to the average molecular weight as controlled by the extent of condensation from oily ones to gum-like ones. The preferred organopolysiloxanes suitable for use in the elastomer composition of the present invention have relatively high average molecular weight giving gum-like consistency. It is recommended that phosphonitrile chloride is used as the catalyst for the condensation reaction when an organopolysiloxane with such a high average molecular weight is to be obtained.

The blending proportion of the ethylene-propylene copolymeric elastomer and the mercapto-containing organopolysiloxane is necessarily such that the polymer blend is composed of from 50 to 95% by weight of the former and from 50 to 5% by weight of the latter or, preferably, from 55 to 90% by weight of the former and from 45 to 10% by weight of the latter. When the amount of the organopolysiloxane is smaller than 5% by weight, the dispersion of the organopolysiloxane in the ethylene-propylene copolymeric elastomer is unsatisfactory, resulting in insufficient improvement of heat and oil resistance and other properties. On the contrary, too much amount of the organopolysiloxane results in further improvement of heat and oil resistance and other properties at the sacrifice of the mechanical strengths of the vulcanizates obtained by the co-vulcanization. This is why the upper limit of 50% by weight, preferably, 45% by weight is laid in the amount of the organopolysiloxane.

The filler as the component (b) in the elastomer composition of the present invention is exemplified by finely divided silica powder, titanium dioxide, calcium carbonate, talc, iron oxide, zinc oxide, diatomaceous earth, carbon black, various kinds of silicates as well as various kinds or organic fillers. The additives customarily used in the formation of the filler into the elastomer composition include dispersing agents, plasticizers, lubricants and the like. It may be noted that the recommended dispersing agents are certain kinds of organosilicon compounds, such as organosilanes and low molecular weight organopolysiloxanes, since they have no adverse effects on the heat stability of the resultant vulcanizates, the improvement of which is one of the objects in the present invention.

The crosslinking agent or the vulcanizing agent as the component (c) is sulfur or an organic peroxide and they may be used in combination. The organic peroxides suitable for use as the component (c) are exemplified by dicumyl peroxide, 1,1-bis(tert-butyl-peroxy)-3,3,5-trimethyl cyclohexane, tert-butyl cumylperoxide, 2,5-dimethyl-2,5-di(tert-butylperoxy)hexane, 1,3-bis(tert-butylperoxy-isopropyl)benzene, tert-butyl-peroxy-isopropylcarbonate and the like. Preferred amount of the component (c) in the inventive composition is in the range from 0.1 to 10 parts by weight or, more preferably, from 0.2 to 5 parts by weight when it is sulfur and from 0.5 to 10 parts by weight when it is an organic peroxide per 100 parts by weight of the component (a), i.e. the polymer blend of the ethylenepropylene copolymeric elastomer and the organopolysiloxane. Vulcanization accelerators and aging retarders may be formulated together with these vulcanizing agents.

The elastomer composition of the present invention is prepared easily by blending the above-mentioned components uniformly on a blending machine such as a Banbury mixer, kneader, two-roll mill and the like. If necessary, the blend is subjected to heat treatment during the blending operation or aging after blending.

The elastomer composition thus prepared is shaped and vulcanized into finished vulcanizates of desired shapes by a conventional fabrication means such as press molding, extrusion, calendering and the like. Thus finished articles can find very wide applications owing to their excellent rubber-like elasticity as well as superior heat resistance, oil resistance, solvent resistance, electric properties, mechanical properties and other properties.

Following are the examples to illustrate the elastomer compositions of the present invention in further detail. The mercapto-containing organopolysiloxanes PMS-1 to PMS-7 used in these examples are composed of the organosiloxane units and have viscosities as specified below.

PMS-1: an organopolysiloxane composed of 99.5 mole % of dimethylsiloxane units and 0.5 mole % of 3-mercaptopropylmethylsiloxane units and terminated at both chain ends with hydroxy groups, having a relative viscosity of 3.2 as measured in a 1% by weight toluene solution at 25° C.

PMS-2: an organopolysiloxane composed of 99.0 mole % of dimethylsiloxane units and 1.0 mole % of 3-mercaptopropylmethylsiloxane units and terminated at both chain ends with hydroxy groups, having a relative viscosity of 3.5 as measured in 1% by weight toluene solution at 25° C.

PMS-3: an organopolysiloxane composed of 90 mole % of dimethyl siloxane units and 10 mole % of 3-mercaptopropylsiloxane units and terminated at both chain ends with trimethylsilyl groups, having a viscosity of 530 centistokes at 25° C.

PMS-4: an organopolysiloxane composed of 99.8 mole % of dimethylsiloxane units and 0.2 mole % of 3-mercaptopropylmethylsiloxane units and terminated at both chain ends with hydroxy groups, having a relative viscosity of 2.6 as measured in 1% by weight toluene solution at 25° C.

PMS-5: an organopolysiloxane having a viscosity of 1300 centistokes at 25° C., prepared by co-hydrolysis of a silane mixture composed of 5 mole % of methyltrichlorosilane, 88 mole % of dimethyldichlorosilane, 2 mole % of trimethylchlorosilane and 5 mole % of 3-mercaptopropylmethyldichlorosilane followed by co-condensation reaction at 40° C. for 24 hours in the presence of sulfuric acid as the catalyst.

PMS-6: an organopolysiloxane composed of 99.5 mole % of dimethylsiloxane units and 0.5 mole % of 3-mercaptocyclopentyl methylsiloxane units and terminated at both chain ends with hydroxy groups, having a relative viscosity of 2.3 as measured in 1% by weight toluene solution at 25° C.

PMS-7: an organopolysiloxane composed of 99.2 mole % of dimethylsiloxane units and 0.8 mole % of the organosiloxane units expressed by the formula

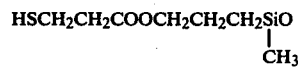

and terminated at both chain ends with trimethylsiloxy units and having a relative viscosity of 2.5 as measured in 1% by weight toluene solution at 25° C.

EXAMPLE 1

According to the formulations as given in Table 1, a mercaptoalkyl group-containing organopolysiloxane PMS-1 or PMS-2, ethylene-propylene-diene terpolymer MITSUI EPT 4021 (product of Mitsui Petrochemical Co., Japan; abbreviated as EPDM in the table), filler, plasticizer, lubricant and vulcanizing agent were blended uniformly into elastomer compositions (Experiments No. 1 to No. 6, Experiment No. 1 being for comparative purpose). Each of these elastomer compositions was fabricated into a sheet about 2 mm thick by press molding under a pressure of 30 kg/cm$^2$ at 170° C. for 30 minutes, which served as a test specimen for the determination of the properties.

The results obtained in the determination of the properties of these test specimens are set out in the table, in which:

"Normal value" is given to a test specimen as vulcanized;

"Heat resistance" is expressed by the ratio of changes in the value of a property obtained with the test specimen heated at 150° C. for 72 hours after vulcanization to the "Normal value"; and "Oil resistance" is expressed by the ratio of changes in the value of a property obtained with a test specimen after immersion in an oil at 70° C. for 72 hours in accordance with the method specified in ASTM No. 3 Oil Immersion test to the "Normal value".

Table 1

| Experiment No. | 1 | 2 | 3 | 4 | 5 | 6 |
|---|---|---|---|---|---|---|
| Formulation : in parts by weight | | | | | | |
| EPDM | 100 | 70 | 60 | 50 | 50 | 70 |
| PMS - 1 | — | 30 | 40 | 50 | 50 | — |
| PMS - 2 | — | — | — | — | — | 30 |
| Carbon black | 80 | 80 | — | 80 | — | 80 |
| Precipitated silica | — | — | 50 | — | — | — |
| Fumed silica | — | — | — | — | 50 | — |
| Process oil | 40 | 40 | 20 | 20 | 20 | 40 |
| Zinc oxide | 5 | 5 | 5 | 5 | 5 | 5 |
| Stearic acid | 1 | 1 | 1 | 1 | 1 | 1 |
| Tetramethylthiuram monosulfide | 1.5 | 1.5 | 1.5 | 1.5 | 1.5 | 1.5 |
| 2-Mercaptobensothiazol | 0.5 | 0.5 | 0.5 | 0.5 | 0.5 | 0.5 |
| Sulfur | 1.5 | 1.5 | 1.5 | 1.5 | 1.5 | 1.5 |
| Properties : Normal value | | | | | | |
| Hardness (JIS) | 70 | 67 | 72 | 72 | 68 | 72 |
| Ultimate elongation, % | 315 | 285 | 270 | 200 | 280 | 230 |
| Tensile strength, kg/cm$^2$ | 113 | 85 | 78 | 75 | 85 | 80 |
| Tear strength, kg/cm | 30 | 24 | 21 | 13 | 20 | 19 |

Table 1-continued

| Experiment No. | 1 | 2 | 3 | 4 | 5 | 6 |
|---|---|---|---|---|---|---|
| Properties: Heat resistance | | | | | | |
| Increase in hardness, % | +22.9 | +14.9 | +9.7 | +9.7 | +11.9 | +16.7 |
| Hardness (JIS) | 86 | 77 | 79 | 79 | 76 | 84 |
| Decrease in ultimate elongation, % | −56.1 | −30.0 | −30.0 | −23.0 | −33.9 | −37.0 |
| Decrease in tensile strength, % | −21.0 | −12.0 | −10.0 | −6.0 | −15.0 | −9.0 |
| Properties: Oil resistance | | | | | | |
| Decrease in hardness, % | −28.6 | −16.4 | −16.7 | −13.9 | −23.5 | −12.5 |
| Hardness (JIS) | 50 | 56 | 60 | 62 | 52 | 63 |
| Decrease in ultimate elongation, % | −74.6 | −60.1 | −50.0 | −43.0 | −58.0 | −45.0 |
| Decrease in tensile strength, % | −59.0 | −40.0 | −36.0 | −33.0 | −43.0 | −40.0 |
| Increase in volume, % | +120 | +70 | +68 | +60 | +72 | +60 | silane mixture composed of dimethyldichlorosilane, phenyltrichlorosilane and methyltrichlorosilane.

Table 2

| Experiment No. | 7 | 8 | 9 | 10 | 11 |
|---|---|---|---|---|---|
| Formulation: parts by weight | | | | | |
| EPDM | 100 | 70 | 70 | 60 | 70 |
| PMS - 1 | — | 27 | 27 | 30 | 23 |
| PMS - 3 | — | 3 | 3 | 3 | 7 |
| PMS - 5 | — | — | — | 7 | — |
| Process oil | 20 | — | — | 3 | 3 |
| Co-hydrolyzate silicone | — | 7 | 7 | — | — |
| Precipitated silica | 50 | 50 | 50 | 50 | 50 |
| Zinc oxide | 5 | 5 | 5 | 5 | 5 |
| Stearic acid | 1 | 1 | 1 | 1 | 1 |
| Tetramethyl thiuram monosulfide | 1.5 | 1.5 | — | 1.5 | — |
| 2-Mercaptobenzothiazol | 0.5 | 0.5 | — | 0.5 | — |
| Sulfur | 1.5 | 1.5 | — | 1.5 | — |
| Diethylane glycol | 3 | — | — | — | 3 |
| Dicumyl peroxide | — | — | 1.6 | — | 1.6 |
| Properties: Normal value | | | | | |
| Hardness (JIS) | 80 | 70 | 74 | 72 | 72 |
| Ultimate elongation, % | 555 | 560 | 365 | 540 | 385 |
| Tensile strength, kg/cm$^2$ | 107 | 106 | 89 | 104 | 102 |
| Tear strength, kg/cm | 39 | 51 | 35 | 46 | 43 |
| Properties: Heat resistance | | | | | |
| Hardness (JIS) | 83 | 74 | 82 | 78 | 78 |
| Increase in hardness, % | +3.8 | +5.7 | +10.8 | +8.3 | +8.5 |
| Decrease in ultimate elongation, % | −72.7 | −16.2 | −39.7 | −20.0 | −45.0 |
| Decrease in tensile strength, % | −48.0 | −8.0 | +3.0 | −10.0 | −30.0 |

EXAMPLE 2

The ingredients shown in Table 2 were blended in the same manner as in Example 1 into elastomer compositions (Experiments No. 7 to No. 11, Experiment No. 7 being for comparative purpose).

Each of these elastomer compositions was shaped by press molding under a pressure of 30 kg/cm$^2$ at 170° C. for 30 minutes into a sheet about 2 mm thick, which was then subjected to heating at 150° C. for 2 hours, to prepare a test specimen with complete vulcanization.

The properties of the thus prepared test specimens were examined in the same manner as in Example 1 for the samples as vulcanized (Normal values) and after heating at 150° C. for 72 hours (Heat resistance) with the results as set out in the table. In this table, the ethylene-propylene-diene terpolymer (EPDM) was the same product as used in Example 1 and the co-hydrolyzate silicone was a product having a viscosity of 20 centistokes at 25° C. prepared by the co-hydrolysis of a silane mixture composed of dimethyldichlorosilane, phenyltrichlorosilane and methyltrichlorosilane.

EXAMPLE 3

Elastomer compositions were prepared by blending the individual ingredients as indicated in Table 3 in the same manner as in Example 1 (Experiments No. 12 to No. 16, Experiment No. 12 being for comparative purpose) and test specimens were obtained with these compositions by press molding and post curing as in Example 1.

These test specimens were obtained for the properties to determine normal values, heat resistance by heating at 150° C. for 120 hours and oil resistance by immersion in oil at 50° C. for 48 hours. The results are set out in the table.

In the table, the EPDM rubber is JSR EP24, a product by Japan EP Rubber Co.; the co-hydrolyzate silicone is the same as in Table 2; the silicone fluid is KF 40, a product by Shin-Etsu Chemical Co.; and the silane-treated filler is a silica filler, a product by DEGUSSA, Germany, treated with mercaptopropyltriethoxysilane.

Table 3

| Experiment No. | 12 | 13 | 14 | 15 | 16 |
|---|---|---|---|---|---|
| Formulation : parts by weight | | | | | |
| EPDM | 100 | 85 | 80 | 60 | 60 |
| PMS - 4 | — | 15 | 20 | 40 | 40 |
| Co-hydrolyzate silicone | 10 | 10 | 10 | 10 | — |
| Silicone fluid | — | — | — | — | 10 |
| Precipitated silica | 50 | 50 | 50 | 50 | 50 |
| Zinc oxide | 5 | 5 | 5 | 5 | 5 |
| Silane-treated filler | 5 | 5 | 5 | 5 | 5 |
| Stearic acid | 1 | 1 | 1 | 1 | 1 |
| Tetramethylthiuram monosulfide | 1.5 | 1.5 | 1.5 | 1.5 | 1.5 |
| 2-Mercaptobenzothiazol | 0.5 | 0.5 | 0.5 | 0.5 | 0.5 |
| Sulfur | 1.5 | 1.5 | 1.5 | 1.5 | 1.5 |
| Properties : Normal value | | | | | |
| Hardness (JIS) | 76 | 74 | 73 | 72 | 70 |
| Ultimate elongation, % | 397 | 320 | 298 | 265 | 333 |
| Tensile strength, kg/cm$^2$ | 170 | 148 | 135 | 107 | 126 |
| Tear strength, kg/cm | 40 | 36 | 32 | 24 | 30 |
| Properties : Heat resistance | | | | | |
| Hardness (JIS) | 86 | 84 | 81 | 78 | 75 |
| Increase in hardness, % | +13.2 | +13.5 | +10.9 | +8.3 | +7.1 |
| Decrease in ultimate elongation, % | −63.1 | −44.8 | −40.0 | −27.8 | −25.0 |
| Decrease in tensile strength, % | −60.0 | −48.0 | −35.0 | −23.0 | −24.7 |
| Properties : Oil resistance | | | | | |
| Increase in volume, % | +340 | +300 | +270 | +210 | +215 |

EXAMPLE 4

Elastomer compositions were prepared by blending the ingredients as indicated in Table 4 in the same manner as in Example 1, and test specimens were obtained with these compositions by press molding and post curing as in Example 1. Experiments No. 19 and No. 20 were underaken for comparative purpose in which too much amount of the organopolysiloxane was used (Experiment No. 19) or no organopolysiloxane was used (Experiment No. 20). In these Experiments, the EPDM used was JSR EP 43 supplied by Japan EP Rubber Co. having a content of the propylene monomer unit of 40 mole % and an iodine value of 6. The tests, the procedure of which being the same as in the preceding examples, gave the results as set out in Table 4.

Table 4

| Experiment No. | 17 | 18 | 19 | 20 |
|---|---|---|---|---|
| Formulation in parts by weight: | | | | |
| EPDM | 70 | 70 | 10 | 100 |
| PMS - 6 | 30 | — | 90 | — |
| PMS - 7 | — | 30 | — | — |
| Precipitated silica | 50 | 50 | 50 | 50 |
| Zinc oxide | 5 | 5 | 5 | 5 |
| Stearic acid | 1.0 | 1.5 | 1.5 | 1.0 |
| Process oil | 15 | 15 | 15 | 20 |
| Sulfur | 0.5 | 0.5 | 0.5 | 0.5 |
| Dicumyl peroxide 3 | 3 | 3 | 6 | |
| Properties : Normal value | | | | |
| Hardness (JIS) | 76 | 63 | 65 | 65 |
| Ultimate elongation, % | 630 | 820 | 600 | 930 |
| Tensile strength, kg/cm$^2$ | 100 | 87 | 90 | 150 |
| Tear strength, kg/cm | 43 | 35 | 33 | 50 |
| Properties : Heat resistance | | | | |
| Hardness (JIS) | 81 | 70 | 69 | 75 |
| Increase in hardness, % | +6.6 | +11.1 | +6.2 | +18.2 |
| Decrease in ultimate elongation, % | −15 | −20 | −13 | −53 |
| Decrease in tensile strength, % | −10 | −10 | −6 | −40 |

What is claimed is:

1. An elastomer composition which comprises
   (a) 100 parts by weight of a polymer blend composed of from 50 to 95% by weight of an ethylene-propylene copolymeric elastomer and from 50 to 5% by weight of an organopolysiloxane containing mercapto-substituted organic groups represented by the average unit formula

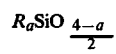

$$R_a SiO_{\frac{4-a}{2}}$$

where R is a monovalent organic group and a is a positive number in the range from 1.90 to 2.05 inclusive and at least 0.2 mole % of the groups represented by the symbol R bonded to the silicon atoms are mercapto-substituted groups, the remainder of the groups being unsubstituted hydrocarbon groups,
   (b) from 100 to 200 parts by weight of a filler, and
   (c) from 0.1 to 10 parts by weight of a crosslinking agent.

2. The elastomer composition as claimed in claim 1 wheein the content of propylene monomer units in the ethylene-propylene copolymeric elastomer is in the range from 15 to 50 mole %.

3. The elastomer composition as claimed in claim 1 wherein the average molecular weight of the ethylene-propylene copolymeric elastomer is in the range from $1 \times 10^5$ to $2 \times 10^5$.

4. The elastomer composition as claimed in claim 1 wherein the mercapto-substituted organic group is a mercapto-substituted hydrocarbon group.

5. The elastomer composition as claimed in claim 1 wherein the mercapto-substituted hydrocarbon group is a mercaptoalkyl group.

6. The elastomer composition as claimed in claim 5 wherein the mercaptoalkyl group is 3-mercaptopropyl group.

7. The elastomer composition as claimed in claim 1 wherein the crosslinking agent is sulfur.

8. The elastomer composition as claimed in claim 1 wherein the crosslinking agent is an organic peroxide.

* * * * *